United States Patent
Michel et al.

(10) Patent No.: US 8,971,822 B2
(45) Date of Patent: Mar. 3, 2015

(54) INTER-CELL COORDINATION FOR FEEDING RELAY NODES

(75) Inventors: Juergen Michel, Munich (DE); Bernhard Raaf, Neuried (DE)

(73) Assignee: Nokia Siemens Networks Oy, Espoo (FI)

( * ) Notice: Subject to any disclaimer, the term of this patent is extended or adjusted under 35 U.S.C. 154(b) by 727 days.

(21) Appl. No.: 12/998,087

(22) PCT Filed: Sep. 18, 2008

(86) PCT No.: PCT/EP2008/062482
§ 371 (c)(1),
(2), (4) Date: Mar. 16, 2011

(87) PCT Pub. No.: WO2010/031436
PCT Pub. Date: Mar. 25, 2010

(65) Prior Publication Data
US 2011/0165871 A1    Jul. 7, 2011

(51) Int. Cl.
*H04B 7/00* (2006.01)
*H04W 16/26* (2009.01)
*H04B 7/155* (2006.01)
*H04B 7/26* (2006.01)

(52) U.S. Cl.
CPC .............. *H04W 16/26* (2013.01); *H04B 7/155* (2013.01); *H04B 7/2606* (2013.01)
USPC .............. 455/69; 455/7; 455/11.1; 455/13.1; 455/452.2; 455/453

(58) Field of Classification Search
None
See application file for complete search history.

(56) References Cited

U.S. PATENT DOCUMENTS

2008/0070510 A1 * 3/2008 Doppler et al. .............. 455/69

FOREIGN PATENT DOCUMENTS

| EP | 1 940 189 A2 | 7/2008 |
| WO | WO 2008/029411 A2 | 3/2008 |
| WO | WO 2008/107851 A2 | 9/2008 |

OTHER PUBLICATIONS

NPL (IEEE 802.16 Broadband Wireless Access Working Group http://ieee802.org/16, Interference Detection and Measurement in OFDMA Relay Networks, pp. 1-12.*
Chen, W-P., et al., "Interference Detection and Measurement in OFDMA Relay Networks", IEEE C802.16j-07/229r1, Mar. 9, 2007, 13 pgs.

* cited by examiner

*Primary Examiner* — Charles Appiah
*Assistant Examiner* — Randy Peaches
(74) *Attorney, Agent, or Firm* — Harrington & Smith

(57) ABSTRACT

It is described a method for distributing network characteristic information within a cellular telecommunication network, which includes a first cell including a first base station and a first relay node and a second cell including a second base station. The method includes carrying out an interference measurement by the first relay node, wherein the interference measurement yields a measurement value being indicative for the inter cell interference between the second base station and the first relay node, and forwarding the measurement value from the first relay node to the second base station. Further, it is described a relay node and a base station, which are adapted, in conjunction with each other, to carry out the described distributing method. Furthermore, computer program for controlling the described distributing method is described.

20 Claims, 3 Drawing Sheets

INTER-CELL COORDINATION FOR FEEDING RELAY NODES

FIELD OF INVENTION

The present invention the interference relates to the technical field of mobile wireless communications and is related more specifically to the system behavior of a cellular telecommunication network in downlink with relay nodes and a self optimization of performance. In particular, the present invention relates to a method for distributing network characteristic information within a cellular telecommunication network, which comprises a first cell including a first base station and a first relay node and a second cell including a second base station. Further, the present invention relates to relay node and to a base station, which are adapted, in conjunction with each other, to carry out the described distributing method. Furthermore, the present invention relates to computer program, which is adapted to control the described distributing method.

ART BACKGROUND

In order to allow for cost efficient and flexible deployment solutions, within the third generation partnership project (3GPP) relaying is investigated as one of the new technologies for Long Term Evolution (LTE) networks and in particular for Long Term Evolution Advanced (LTA-A) networks. It has been shown that with the usage of Relay Nodes (RN) the spatial coverage and/or the capacity of a base station can be significantly increased. Further, areas can be covered which without using RN would suffer from bad radio conditions. Such areas are located typically at the edge of a cell being served by a particular base station (BS).

Also the IEEE standardization bodies such as the IEEE 802.11 and IEEE 802.16 group notice and investigate the potential of relaying technology. In this respect it is mentioned that the specification IEEE 802.16 is influenced by the Wireless World Initiative New Radio (WINNER) project (see http://www.ist-winner.org/), wherein investigations regarding RN are carried out.

In LTE-A networks for implementing relaying technology a cellular system is considered, which comprises base stations being deployed e.g. with a typical hexagonal cell layout. A base station in a LTE network is also called enhanced NodeB (eNB). For each cell being served by one eNB for instance one to twenty RN are deployed typically near the cell border or the cell edge. Then in each cell, mobile terminals (MT) or User Equipments (UE) can communicate directly with the eNB over a one-hop link or alternatively establish a two-hop link connection through a RN. Thereby, three different types of radio links are involved in a cell comprising a serving eNB, at least one RN and at least one UE:
a) The link between the eNB and the RN (called relay link or feeder link)
b) The link between a RN and a UE (called access link)
c) The link between the eNB and a UE (called direct link)

In this context a major difference between RN and BS respectively between RN and eNB is that an RN does not have a cable connection to a core network and therefore signaling and data transmission, which is done to conventional base stations via cable connections, has to be done in a wireless manner. This is called feeding of RN with data, which also includes data transmission of S1 and X2 signaling as well. Thereby, S1 signaling is a data transmission via the so called S1 interface, which connects to gateways of the mobile telecommunication network with a typically IP based core network. X2 signaling is a data transmission via the so called X2 interface, which connects different eNBs with each other.

The problem of feeding the RNs can be addressed by resource partitioning, i.e. how to split the bandwidth and time slots available in each radio frame and ensure that there are physical data transmission resources available to ensure wireless connectivity between the core network and RNs.

Regarding the quality of the data connection between a RN and the core network the achievable Signal to Interference and Noise Ratio (SINR) on the relay link is an important measure and determines how fast RNs can be fed and how efficient a two-hop transmission from an eNB to a UE via a RN can be done. This is especially critical due to the fact that RNs are typically located at the cell border and are operated in general in medium or low SINR conditions only and would mean that the relay link limits the achievable throughput in many cases.

Mainly due to the fact that the height of the UE, RN and eNB antennas are different, the distance dependant path-loss between RN to UE, UE to eNB and eNB to RN is different. For example for a 2 GHz carrier frequency the following modeling regarding the path-loss seems to be reasonable and is currently discussed in 3GPP.

TABLE 1

Path-loss model law for different radio links.

| Link | Path-loss model law |
|---|---|
| eNB-RN | 127.0 + 30.0 log10 [R in km] |
| eNB-UE | 128.1 + 37.6 log10 [R in km] |
| RN-UE | 136.7 + 39.2 log10 [R in km] |

A further assumption used in studies regarding simulating relaying scenarios is that the UEs are often located indoor and therefore a penetration loss of 20 dB is added to the path-loss between the RN to UE and the eNB to UE link. Such a penetration loss is not added to the path-loss between the eNB and the RN because both network elements are typically located outdoor.

FIG. 4 shows a typical state of the art deployment of relay nodes 414, 424 in a hexagonal cell scenario of a macro cellular telecommunication network 400. As can be seen from FIG. 4, the telecommunication network 400 network comprises amongst others a first base station 412 and a second base station 422. Each base station serves three sectors. A first sector 410 is assigned to a first cell being served by the first base station 412. A second sector 420 is assigned to a second cell being served by the second base station 422. In order to extend the spatial coverage of the cells 410 and 420 the relay nodes 414 and 424 are located in the region of the outer borders of the cells 410 and 420, respectively. Within the first cell 410 there are located user equipments 416a, which are directly served by the first base station 412, and user equipments 416b, which are served by the relay nodes 414. Within the second cell 420 there are located user equipments 426a, which are directly served by the second base station 422, and user equipments 426b, which are served by the relay nodes 424.

As mentioned above a precondition to transmit downlink data from the BS 412, 422 to the UEs 416b, 426b at the cell edge via the RN 414, 424, the BS 412, 422 has to feed the RN 414, 424 with data first (first hop, wireless connectivity between RN and the corresponding BS) and then in the second hop utilize the RN 414, 424 for connecting the UEs 416b, 426b.

In a known LTE-A network, which is based on Frequency Division Duplex, it is necessary to separate or reserve radio transmission resources (for instance time slots) for radio transmissions between the BS and the RNs and/or between the BS and the directly served UEs. Other radio transmission resources have to be reserved for radio transmissions between RNs and UEs in order to avoid interference from RNs during BS to UE transmission and interference from BS during RN to UE transmission.

As has already mentioned above due to the fact that the RNs are typically located at the cell boarder the achievable SINR during the BS to RN transmission is low. In order to improve the situation it is known to feed the RNs of neighboring cells at different times or using different parts of the available frequency bandwidth. Such an approach, which is equivalent to assume a static or time dependent frequency reuse scheme for relay links has the disadvantage that the available data transmission resources are typically be used in a non efficient manner. This results in that the overall data throughput within the whole cellular telecommunication network is limited.

There may be a need for increasing the overall data throughput within a cellular telecommunication network, which comprises at least one relay node being fed by a macro base station.

SUMMARY OF THE INVENTION

This need may be met by the subject matter according to the independent claims. Advantageous embodiments of the present invention are described by the dependent claims.

According to a first aspect of the invention there is provided a method for distributing network characteristic information within a cellular telecommunication network, which comprises a first cell including a first base station and a first relay node and a second cell including a second base station. The provided method comprises (a) carrying out an interference measurement by the first relay node, wherein the interference measurement yields a measurement value being indicative for the inter cell interference between the second base station and the first relay node, and (b) forwarding the measurement value from the first relay node to the second base station.

This first aspect of the invention is based on the idea that results of interference measurements carried out by the first relay node (RN) can not only be reported to first network elements being assigned to the first cell respectively to the first base station (BS), but can also be reported to second network elements being assigned to another cell respectively the second base station. The first cell and the second cell may be neighboring macro cells of the cellular telecommunication network. This may provide the advantage that the second base station can take into account this measurement value when transmitting radio data in the downlink direction to user equipments (UEs) and/or relay nodes (RNs) being respectively assigned to the second cell.

The described inter-cell reporting may provide the advantage that the second BS can coordinate its transmitting behavior with the first BS. In this respect it is mentioned that of course it may also be possible however not necessary that in addition to reporting to the second BS the first RN also reports the acquired measurement value to the first BS. An inter-cell coordination of the downlink transmitting behavior between the first base stations and the second base stations in particular with respect to the first RN and the second RN, respectively, can also be seen as a kind of self optimizing procedure within at least the first cell and the second cell of the cellular telecommunication network.

The described interference measurement can be carried out by the first RN within a radio transmission resource, which may be the same as the radio transmission resource being used for transmitting data within the first cell in particular for a downlink data connection between the first BS and the first RN. Further, the interference measurement can also be carried out within those radio transmission resources that are allocated to a transmission of the first BS to the second RN according to an Inter Cell Interference Cancellation (ICIC) scheme and/or a frequency reuse scheme.

In this context it is pointed out that for transmitting data via a radio link an appropriate radio transmission resource has to be provided. Typically, the overall radio transmission resource is subdivided in minimum radio transmission resource units for the wireless data transfer. This minimum unit may be called a physical resource block (PRB), a chunk, or considering only the time dimension a slot and/or a frame. The minimum unit may be illustrated as a two-dimensional element within a coordinate system having a time-axis and a frequency-axis.

According to an embodiment of the invention the method further comprises adjusting the transmission power of the second base station based on the measurement value in such a manner that the strength of inter-cell interference between the second base station and the first relay node is below a predefined interference level.

This may mean that the second BS selects its output power based on the measurement value in such a manner, that significant interference effects origination from the second BS and acting on the first RN are prevented. In other words, reducing the transmission power when in the second cell a downlink transmission from the second BS to a second RN being assigned to the second cell takes place on the same radio data transmission element, the SINR condition at the first RN can be significantly improved. This may be based on the fact that a low transmission power of the second BS does not disturb or reduce the improved SINR condition at the second RN due to the described interference coordination. Of course, this may also hold for other base stations (BSs), which are assigned to other cells than the first cell and the second cell of the described telecommunication network and which may also be located in the neighborhood of the first cell.

It has to be mentioned that the second BS can receive a measurement value not only from the first RN but also from other RNs being assigned to the first cell or to another cell apart from the second cell. Dependent on the measurement values received from different RNs a second BS with an unnecessarily low power setting for its downlink transmissions to UEs would typically receive measurement values, which respectively indicate a small inter cell interference from the respective RN. In the following, the second BS could increase its transmission power in order to optimize the overall system performance. If the power of the downlink transmissions from the second BS to its served UEs has been increased, the corresponding power offset value (i.e. power offset between downlink shared data channel and downlink BCCH channel) could be transmitted by means of a Broadcast Control Channel (BCCH) signal from the second BS to its served UEs. Thereby, the available information on the transmission power between the second BS and its served UEs can be easily updated.

According to a further embodiment of the invention the method further comprises (a) feeding the first relay node by the first base station by using a first radio transmission resource and (b) feeding a second relay node being included in the second cell by the second base station by using a second radio transmission resource. Thereby, the first radio transmission resource and the second radio transmission resource are different from each other.

The first radio transmission resource and the second radio transmission resource may be separated for instance in frequency and/or in time from each other.

Due to the separation between the first and the second radio transmission resource the two base stations may feed the respective RN with a full power radio transmission without causing interference problems, which might result from downlink signals being transmitted from the first BS and erroneously being received by the second RN and/or which might result from downlink signals being transmitted from the second BS and erroneously being received by the first RN.

According to a further embodiment of the invention the method further comprises (a) feeding the first relay node by the first base station by using a first radio transmission resource and (b) transmitting data from the second base station to at least one second user equipment being located within the second cell with a reduced transmitting power by using a second radio transmission resource. Thereby, the first radio transmission resource and the second radio transmission resource at least partially overlap with each other.

By using a reduced transmitting power the second BS may serve in a downlink connection second user equipments (UEs), which are currently located close to the second BS. Thereby, the same first and the second radio transmission resource may be the same or may have at least a partial overlap with each other. In this respect an overlap between two radio transmission resources means that there is an overlap both in time and in frequency between the two radio transmission resources.

In other words, when specifically reducing the transmitting power of the second BS the same radio transmission resource can be used (a) by the first BS for feeding the first RN and (b) by the second BS for transmitting radio signals to nearby second UEs. Thereby, the downlink data transmission from the second BS to nearby second UEs can be done without or with only a low impact on the radio connection between the first BS and the first RN.

A user equipment (UE) may be any type of communication end device, which is capable of connecting with an arbitrary telecommunication network access point such as a base station or a relay node. In particular the UE may be a cellular mobile phone, a Personal Digital Assistant (PDA), a notebook computer and/or any other movable communication device.

According to a further embodiment of the invention the interference measurement is carried out individually for the second base station. This may mean that by contrast to known interference measurement procedures, which are related to a coordination within the telecommunication network and a Self Optimization of the Network (SON), according to the described method the measured interference power is not the sum power of interference coming from all surrounding BSs, which are currently transmitting to its served UEs. Of course, if there are more neighboring BSs surrounding the second RN, when applying the described method each individual interference power coming from each one of these surrounding BSs can be measured. Of course all these measurement values resulting from these individual interference measurement procedures can be forwarded to the respective BS, which causes the corresponding interference. This means, that the above described power coordination between the second and the first BS can be extended to a coordination respectively to a self optimizing of a plurality of neighboring BSs.

According to a further embodiment of the invention the interference measurement is carried out with a control signal, which is transmitted from the second base station. This may provide the advantage that the interference measurement can be carried out with a radio signal, which is transmitted by the second base station with a maximum power. The used control signal may be for instance a Broadcast Control Channel (BCCH), a Primary Synchronization Signal (PSS), a Secondary Synchronization Signal (SSS) and/or any pilot signal, which is/are transmitted by the second BS or any other neighboring BSs.

By contrast to an interference measurement procedure carried out with a radio signal having a reduced strength the described evaluation of the control signal being transmitted with full transmitting power may provide the advantage that the interference measurement can be carried out much more precise. Further, the interference measurement procedure being based on full power signals can even be carried out, if the corresponding data signals are too weak in order to produce a significant interference effect.

Further, in order to calculate from the strength of the received control signal the interference taking place at the first RN and being caused by a transmission of the second BS to the second UE or to the second UEs, information on an appropriate downlink (DL) power offset between the power of control signal transmitted by the second BS and the power of data signals transmitted from the second BS to its served UE can be signaled by means of the control signal of the second BS and can be applied by the first RN when calculating the measurement value.

In other words, for the applied interference coordination schemes e.g. for BS to RN transmission, it is not necessary to measure directly the interference during the RX times on the allocated radio transmission resource. It is merely also possible to carry out the interference measurement procedure with any signal, which is transmitted with an increased or even with a full transmitting power.

At this point it is mentioned that a power offset for radio signals being transmitted downlink is known and is often called "K-value". Thereby, the transmitting power of the control signal minus the K-value results in the transmitting power of the DL communication between the second BS and its served UEs (power calculation in logarithmic domain).

However, by contrast to known interference measurement methods the described interference measurement method is based on individual interference measurements, which are carried out by the first RN with respect to one or more neighboring BSs.

According to a further embodiment of the invention the measurement value is an individual interference over thermal value. This may provide the advantage the forwarded measurement value is characteristic only for interference effects which are larger than a non avoidable thermal noise. In other words, interference effects, which are not relevant because they have a smaller power than the thermal noise are not taken into account.

According to a further embodiment of the invention the step of forwarding the measurement value from the first relay node to the second base station comprises a first forwarding from the first relay node to the first base station and a second forwarding from the first base station to the second base station. This may provide the advantage that the first RN can use its usual wireless connection to the feeding first base station for transmitting the acquired measurement value. Further, the second forwarding can be carried out via a wired connection between the first and the second base station for instance via a known X2 interface. However, the second forwarding can also include a multi hop data transmission for instance via a core network of the cellular telecommunication network.

In other words, the first RN may signal the measurement value respectively the individual IoT value of the second BS eNB to the first BS together with the physical cell ID of the second BS, which has generated the IoT at the first RN. Then the first BS may signal the IoT value together with the physical cell ID to the second BS for instance by utilizing a wired X2 and/or a S1 signaling. Further there may also be a direct logical X2 connection between the first RN and the second BS via the first BS.

According to a further embodiment of the invention the step of forwarding the measurement value from the first relay node to the second base station comprises a direct forwarding from the first relay node to the second base station. This may provide the advantage that the measurement value can be conveyed very quickly to the second BS. This in turn may mean that the first RN directly signals the measurement value in a wireless manner over a cell border to the second BS that has generated the interference at the first RN. In this respect it is mentioned that unlike a BS a RN and here the first RN has inherently the ability to communicate via the air interface with a BS. Therefore, in principle the first RN could also communicate with a neighbor eNB.

In order to signal the measurement value directly to the second BS the first RN can for instance transmit a Random Access Channel (RACH) like signal to the second BS and transmit the information representing the acquired measurement value by means of this signal. Thereby, the measurement value could be coded into a preamble signal for the RACH, and could utilize a dedicated root sequence to distinguish between other RACH signals being intended for other UEs and RNs.

According to a further embodiment of the invention the method further comprises (a) carrying out a further interference measurement by a further relay node being included in the first cell, wherein the further interference measurement yields a further measurement value being indicative for the inter cell interference between the second base station and the further relay node, and (b) selecting one of the measurement value and the further measurement value as to represent the measurement value being forwarded to the second base station.

This may mean that if more than one RN is operated within the first cell two or even more measurement values may be acquired which are indicative for the respective inter cell interference from the second base station to the respective RN. This means that the various interference signals are caused by one and the same BS having an unambiguous physical cell ID. By selecting respectively by filtering out only one of these measurement values, it is necessary to signal only one measurement value to the second BS (with the received physical cell ID).

A selection function for example could be to only transmit the maximum received measurement value such as the maximum IoT value, which is related to a specific physical cell ID to the second BS representing the source BS for the various interference signals received by the various RNs of the first cell. This may provide the advantage that for controlling the output power of the second BS a measurement value will be employed, which has been acquired by the RN, which is suffering most severely from interfering radio signals and which limits the tolerable transmitting power of the second BS.

According to a further embodiment of the invention the telecommunication network is a long term evolution network or an advanced long term evolution network. This may provide the advantage that the described method can be carried out within those types of telecommunication networks, which provide for an in particular high benefit from the usage of RNs.

However, it has to be pointed out that the described method can also be carried out in other radio network technologies. Of course, parameters and procedures have to be adapted to the other technology, which might involve other interfaces and architectures.

According to a further aspect of the invention there is provided a first relay node for distributing network characteristic information within a cellular telecommunication network, which comprises a first cell including a first base station and the first relay node and a second cell including a second base station. The provided first relay node comprises (a) a measurement unit for carrying out an interference measurement, wherein the interference measurement yields a measurement value being indicative for the inter cell interference between the second base station and the first relay node, and (b) a forwarding unit for forwarding the measurement value to the second base station.

This further aspect of the invention is based on the idea that results of interference measurements carried out by the first RN can be reported from the first cell to the second BS being assigned to the second cell. The second BS can take into account the corresponding measurement value when transmitting radio data in the downlink direction to UEs and/or RNs being respectively assigned to the second cell. In particular, the second BS can select a proper transmitting power, which ensures that on the one hand there is a reliable radio connection between the second BS and at least those UEs, which are presently located close to the second BS and on the other hand there is no or only negligible inter-cell interference between the second BS and the first RN.

In conjugation with at least the second BS the described first RN may be adapted to accomplish any embodiment of the above described method for distributing network characteristic information.

According to a further aspect of the invention there is provided a second base station for receiving a network characteristic information of a cellular telecommunication network, which comprises a first cell including a first base station and a first relay node and a second cell including the second base station. The provided second base station comprises a receiving unit for receiving a measurement value from the first relay node, which has acquired the measurement value by means of an interference measurement, wherein the measurement value is indicative for an inter cell interference between the second base station and the first relay node.

Also this further aspect of the invention is based on the idea that results of interference measurements carried out by the first RN can be reported between different cells of the telecommunication network. The second BS can take into account the corresponding measurement value when transmitting radio data in the DL direction to its served UEs and/or to its RNs.

In conjugation with at least the above described first RN the second BS may be adapted to accomplish any embodiment of the above described method for distributing network characteristic information.

According to a further aspect of the invention there is provided a computer program for distributing network characteristic information within a cellular telecommunication network, which comprises a first cell including a first base station and a first relay node and a second cell including a second base station. The computer program, when being executed by a data processor, is adapted for controlling the above described.

As used herein, reference to a computer program is intended to be equivalent to a reference to a program element and/or a computer readable medium containing instructions for controlling a computer system to coordinate the performance of the above described method.

The computer program element may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or other programmable device to carry out the intended functions. The computer program may be available from a network, such as the WorldWideWeb, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
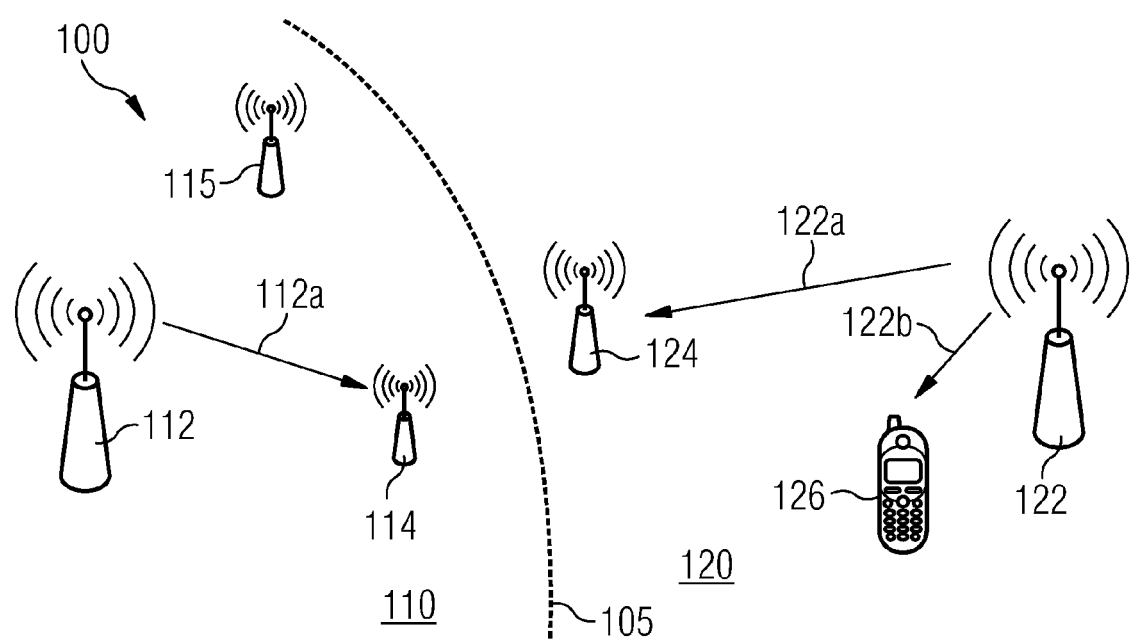
FIG. 1 illustrates two different operational states of a base station of a telecommunication network in accordance with an embodiment of the invention.

The illustration in the drawing is schematically. It is noted that in different figures, similar or identical elements are provided with the same reference signs or with reference signs, which are different from the corresponding reference signs only within the first digit.

FIG. 1 shows a cellular telecommunication network 100. The telecommunication network 100 comprises a first base station (BS) 112 serving a first cell 110 and a second BS 122 serving a second cell 120. The two cells 110 and 120 are adjacent with respect to each other along a common cell border 105.

A first relay node (RN) 114 and a further RN 115 are located within the first cell 110. A feeding downlink (DL) connection 112a between the BS 112 and the first RN 114 is denominated with reference numeral 112a.

A second RN 124 and user equipment (UE) 126 are located within the second cell 120. A feeding DL connection between the BS 122 and the second RN 124 is denominated with reference numeral 122a. A direct DL connection between the BS 122 and the UE 126 is denominated with reference numeral 122b.

FIG. 1 shows a first situation in which the RN 124 is loaded with data from BS 122 along the DL connection 122a without any interference coordination. FIG. 1 further shows a second situation, wherein a high interference between the second BS 122 and the first RN 114 is effectively avoided simply by transmitting from the second BS 122 to the nearby UE 126 along the direct DL connection 122b with a lower downlink power as compared to the first situation. Since the reduced DL power of the second BS 122 will not strongly interfere with the data transmission along the DL connection 112a, the data transmission along the DL connection 112a and the data transmission along the DL connection 122a can be carried out simultaneously.

In other words, the BS to RN transmissions within the two cells 110 and 120 are coordinated in such a manner that by contrast to known data transmission scenarios an additional utilization of radio transmission resources is possible for transmitting data from the second BS 122 to the UE 126 with a reduced transmission power at the same time when in the neighbor cell 110 or in other non depicted neighbor cells an BS 112 to RN 114 transmission takes place on the same radio transmission resources.

Advantages of the described coordination are mainly (a) the improvement of the SINR condition at the RN 114 and (b) the fact that a low transmission power does not disturb or reduce the improved SINR condition at the RN 114 (improvement due to interference coordination). Therefore, the BS 122 to nearby UE 126 transmission can be done without or with only low impact on the BS 112 to RN 114 transmission.

At this point it is mentioned that investigations, which have been carried out by the inventors, with a simple BS and RN deployment and the path-loss model described above in Table 1 show, that, if an RN is located at or near the cell boarder, without the above described coordination of the BS to RN transmissions typical SINR values for BS to RN downlink (DL) transmissions of only approximately 5 dB ($SINR_a$) or even lower are achievable. By contrast thereto, if the above described coordination of the BS to RN transmissions (interference coordination) is applied on the used radio transmission resources, which means for instance that if a BS in one cell transmits to its RN other BSs of in particular the neighboring cells do not transmit on this radio transmission resources or transmit only with low transmission power, the achievable SINR values can be significantly increased up to values of approximately 14 dB or even higher ($SINR_b$).

When using Frequency Division Duplex, the corresponding gains with respect to the data rates along the DL connection 112a, which gains can be obtained by the described interference coordination, can be calculated by using the known Shannon formula:

data rate=BW×log(1+SINR$_a$)<BW/2×log(1+SINR$_b$)
2.1×BW<2.4×BW

Thereby, BW is the available frequency bandwidth.

Figure 2A:
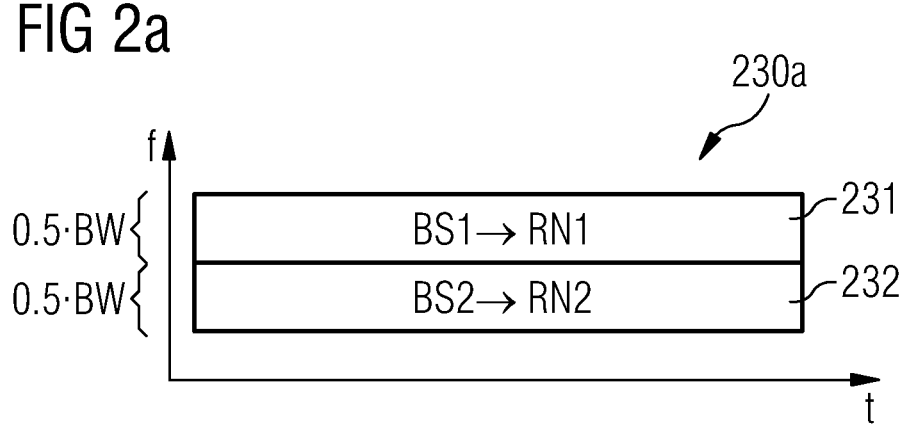
FIGS. 2a and 2b show two alternative radio transmission resource partitioning schemes.
Figure 2B:
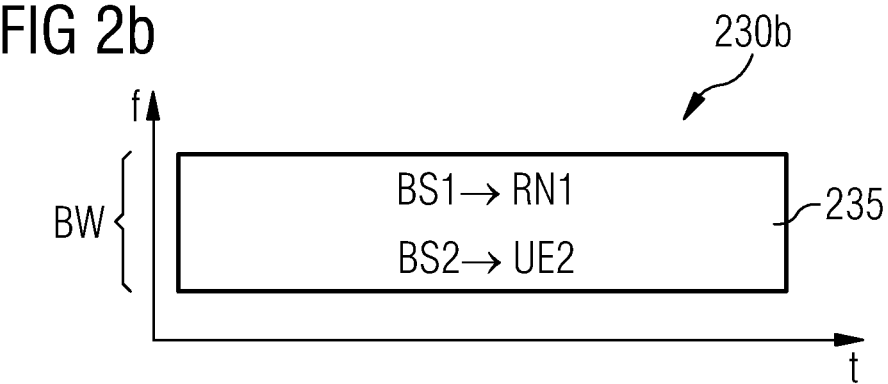

FIGS. 2a and 2b show two alternative radio transmission resource partitioning schemes 230a and 230b within respectively a coordinate plane having a time axis t and a frequency axis f.

The partitioning scheme 230a shown in FIG. 2a is applicable for the above described first situation in which the RN 124 of the second cell 120 is loaded with data from its feeding BS 122 along the DL connection 122a. Since the RN 124 is located close to the cell border 105 and in order to avoid significant interferences between (a) data being transmitted from the first BS (BS1) 112 to the first RN (RN1) 114 along the DL connection 112a and (b) data being transmitted from the second BS (BS2) 122 to the second RN (RN2) 124 along the DL connection 122a, different radio transmission resources are used for these data transmissions.

According to the embodiment described here the separation between the different radio transmission resources is accomplished by means of a frequency separation, wherein for each data transmission half of a total available bandwidth BW is available. The corresponding first and second radio transmission resources are denominated with reference numerals 231m and 232, respectively.

Just for the sake of completeness it is mentioned that of course the separation between the different partial radio transmission resources could also be accomplished by means of a separation in time. Also a combination of a separation in frequency f and in time t would be possible.

The partitioning scheme 230b shown in FIG. 2b is applicable for the above described second situation, wherein a high interference between the second BS 122 and the first RN 114 is effectively avoided by using a reduced DL transmitting power when sending data from the second BS 122 to the nearby UE 126 along the direct DL connection 122b. In this case both data transmissions (a) between the first BS (BS1) 112 and the first RN (RN1) 114 and (b) between the second BS (BS2) 122 and the second RN (RN2) 124 can be accomplished within the same common radio transmission resource 235 having the full available bandwidth BW.

Figure 3A:
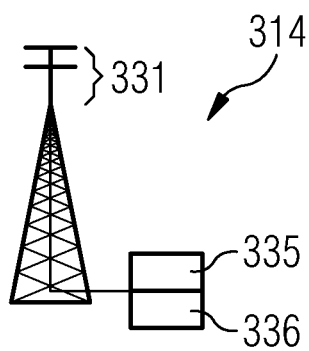
FIG. 3a shows a relay node in accordance with an embodiment of the invention.

FIG. 3a shows relay node (RN) 314 in accordance with an embodiment of the invention. The RN 314 comprises an antenna 331 for connecting via a radio link to a base station (BS) and to user equipments (UE).

Further, the RN 314 comprises a measurement unit 335 and a forwarding unit 336. The measurement unit 335 is adapted for carrying out an interference measurement, wherein the interference measurement yields a measurement value being indicative for the inter cell interference between a not depicted second base station (BS) being assigned to a neighboring cell and the RN 314. The forwarding unit 336 is adapted for forwarding the measurement value to the second BS.

Figure 3B:
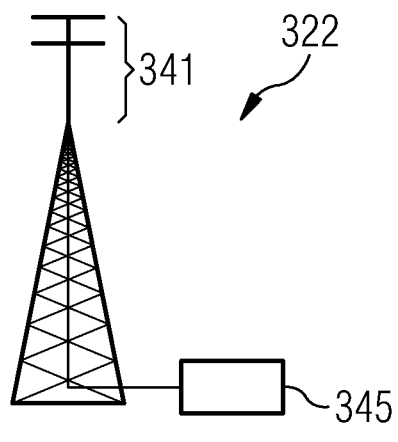
FIG. 3b shows a base station in accordance with an embodiment of the invention.
Figure 4:
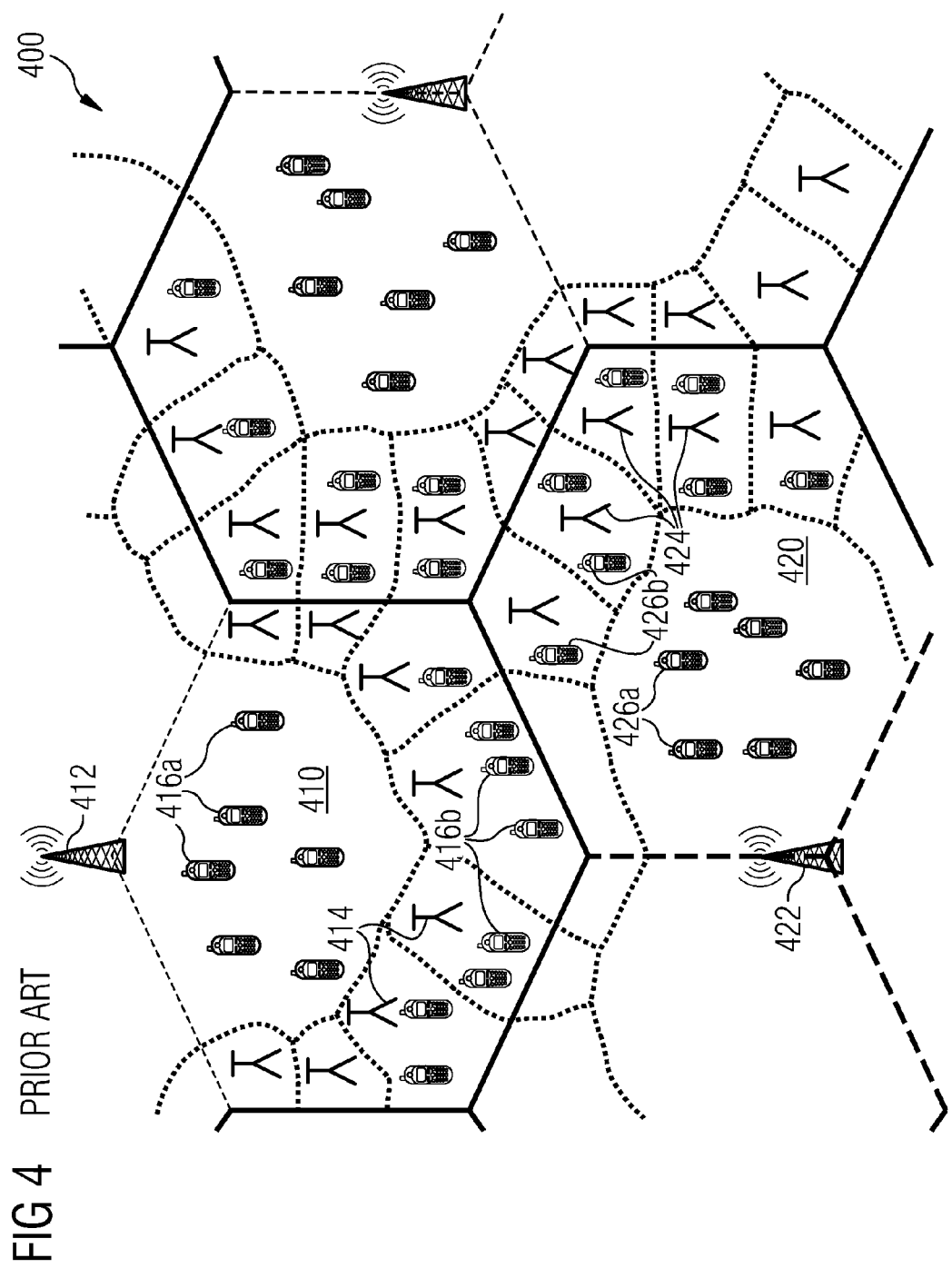
FIG. 4 shows a state of the art deployment of relay nodes in a hexagonal cell scenario of a cellular telecommunication network.

FIG. 3b shows base station (BS) 322 in accordance with an embodiment of the invention. The BS 322 comprises an antenna 341 for connecting via a radio link to a relay node (RN) and to user equipments (UE).

Further, the BS 322 comprises a receiving unit 345, which is adapted for receiving a measurement value from the a non depicted RN being assigned to a neighboring cell, which RN has acquired the measurement value by means of an interference measurement. The measurement value is indicative for an inter cell interference between the BS 322 and the RN.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS 100 cellular telecommunication network
105 cell border
110 first cell
112 first base station
112a downlink connection BS-RN
114 first relay node
115 further relay node
120 second cell
122 second base station
122a downlink connection BS-RN
122b downlink connection BS-UE
124 second relay node
126 user equipment
230a radio transmission resource partitioning scheme
230b radio transmission resource partitioning scheme
231 first radio transmission resource
232 second radio transmission resource
235 common radio transmission resource
BW frequency bandwidth
f frequency
t time
314 relay node
322 base station
331 antenna
335 measurement unit
336 forwarding unit
341 antenna
345 receiving unit
400 cellular telecommunication network
410 first cell/first sector
412 first base station
414 first relay node
416a user equipment
416b user equipment
420 second cell
422 second base station/second sector
424 second relay node
426a user equipment
426b user equipment

The invention claimed is:

1. A method comprising: carrying out an interference measurement by at a first relay node in a first cell of a telecommunications network comprising the first cell and a second cell, and wherein the first cell includes a first base station and a first relay node and the second cell includes a second base station; wherein the interference measurement yields a measurement value indicative of inter cell interference between the second base station and the first relay node, and wherein the interference measurement is carried out using a control signal transmitted from the second base station; forwarding the measurement value from the first relay node to the second base station; wherein the first relay node is fed by the first base station using a first radio transmission resource different from a second radio transmission resource used by the second base station to feed a second relay node included in the second cell.

2. The method as set forth in claim 1, further comprising adjusting the transmission power of the second base station based on the measurement value in such a manner that the strength of inter-cell interference between the second base station and the first relay node is below a predefined interference level.

3. The method as set forth in claim 1, wherein data is transmitted from the second base station to at least one user equipment located within the second cell with a reduced transmitting power by using a third radio transmission resource, wherein the first radio transmission resource and the third radio transmission resource at least partially overlap with each other.

4. The method as set forth in claim 1, wherein the interference measurement is based only on interference power generated by the second base station.

5. The method as set forth in claim 1, wherein the measurement value is based only on interference effects exceeding thermal noise.

6. The method as set forth in claim 1, wherein forwarding the measurement value from the first relay node to the second base station comprises a first forwarding from the first relay node to the first base station and a second forwarding from the first base station to the second base station.

7. The method as set forth in claim 1, wherein forwarding the measurement value from the first relay node to the second base station comprises a direct forwarding from the first relay node to the second base station.

8. The method as set forth in claim 1, further comprising:
selecting one of a measurement value and a further measurement value to represent the measurement value being forwarded to the second base station, wherein the further measurement value is determined by a further interference measurement carried out by a further relay node included in the first cell, wherein the further interference measurement yields the further measurement value, the further measurement value being indicative of the inter cell interference between the second base station and the further relay node.

9. The method as set forth in claim 1, wherein the telecommunication network is a long term evolution network or an advanced long term evolution network.

10. An apparatus comprising:
at least one processor;
memory storing computer program code;
wherein the memory storing the computer program code is configured to, with the at least one processor, cause the apparatus to at least;
cause distribution by a first relay node of network characteristic information within a cellular telecommunication network comprising a first cell including a first base station and the first relay node and a second cell including a second base station;
cause carrying out of an interference measurement by the first relay node, wherein the interference measurement yields a measurement value being indicative for the inter cell interference between the second base station and the first relay node, and wherein the interference measurement is carried out using a control signal transmitted from the second base station;
cause forwarding by the first relay node of the measurement value to the second base station; and
wherein the first relay node is fed by the first base station by using a first radio transmission resource, wherein the first radio transmission resource is different from a second radio transmission resource used by the second base station to feed a second relay node included in the second cell.

11. The apparatus as set forth in claim 10, wherein data is transmitted from the second base station to at least one user equipment located within the second cell with a reduced transmitting power by using a third radio transmission resource, wherein the first radio transmission resource and the third radio transmission resource at least partially overlap with each other.

12. The apparatus as set forth in claim 10, wherein the interference measurement is based only on interference power generated by the second base station.

13. The apparatus as set forth in claim 10, wherein the measurement value is based only on interference effects exceeding thermal noise.

14. The apparatus as set forth in claim 10, wherein forwarding the measurement value from the first relay node to the second base station comprises a first forwarding from the first relay node to the first base station and a second forwarding from the first base station to the second base station.

15. The apparatus as set forth in claim 10, wherein forwarding the measurement value from the first relay node to the second base station comprises a direct forwarding from the first relay node to the second base station.

16. The apparatus as set forth in claim 10, wherein the apparatus is further caused to select one of a measurement value and a further measurement value to represent the measurement value being forwarded to the second base station, wherein the further measurement value is determined by a further interference measurement carried out by a further relay node included in the first cell, wherein the further interference measurement yields the further measurement value, the further measurement value being indicative of the inter cell interference between the second base station and the further relay node.

17. The apparatus of claim 10, wherein the apparatus operates in a relay node of a telecommunications network.

18. An apparatus comprising:
at least one processor;
memory storing computer program code;
wherein the memory storing the computer program code is configured to, with the at least one processor, cause the apparatus to at least:
receive a measurement value from a first relay node of a cellular telecommunication network comprising a first cell including a first base station and the first relay node and a second cell including the apparatus, the first relay node having acquired the measurement value by means of an interference measurement carried out using a control signal transmitted from the second base station, wherein the measurement value is indicative of inter cell interference between the second base station and the first relay node and wherein the first relay node is fed by the first base station is performed using a first radio transmission resource; and;
feed a second relay node included in the second cell by using a second radio transmission resource, wherein the first radio transmission resource and the second radio transmission resource are different from each other.

19. The apparatus of claim 18, wherein the apparatus is a base station of a telecommunications network.

20. A non-transitory computer readable medium storing a program of instructions, execution of which by a processor configures an apparatus to carry out the method of claim 1.

* * * * *